United States Patent [19]

Hucul

[11] Patent Number: 4,891,346

[45] Date of Patent: Jan. 2, 1990

[54] REDISPERSAL OF RU, OS, RH AND PD CATALYSTS AND PROCESSES THEREWITH

[75] Inventor: Dennis A. Hucul, Midland, Mich.

[73] Assignee: The Dow Chemical Company, Midland, Mich.

[21] Appl. No.: 833,642

[22] Filed: Feb. 25, 1986

[51] Int. Cl.$^4$ .................. B01J 23/96; B01J 38/42; C07C 67/36

[52] U.S. Cl. ........................ 502/35; 502/53; 502/230; 502/333; 560/206; 560/207

[58] Field of Search .................. 502/35, 36, 37, 53, 502/230; 560/206, 207

[56] References Cited

U.S. PATENT DOCUMENTS

| | | | |
|---|---|---|---|
| 3,134,732 | 2/1964 | Kearby et al. | 208/140 |
| 3,488,295 | 9/1970 | Sennewald et al. | 252/413 |
| 3,625,860 | 12/1971 | Condrasky et al. | 502/35 |
| 3,969,267 | 7/1976 | McVicker et al. | 208/140 |
| 3,972,829 | 8/1976 | Michalko | 502/230 |
| 4,192,771 | 3/1980 | Burblage et al. | 208/139 |
| 4,331,825 | 5/1982 | Whyman | 208/139 |
| 4,410,722 | 10/1983 | Miyazaki et al. | 560/204 |
| 4,480,121 | 11/1984 | Klun et al. | 560/206 |
| 4,713,363 | 12/1987 | Hucul | 502/262 |
| 4,743,705 | 5/1988 | Hucul et al. | 560/207 |

OTHER PUBLICATIONS

Lemaitre, J. et al., "The Measurement of Catalyst Dispersion" in *Characterization of Heterogeneous Catalysts*, Delannay, F. (ed.), Marcel Dekker, 1984, pp. 299–324.

Anderson, J. R., *Structure of Metallic Catalysts*, Academic Press, 1975, pp. 289–357, 358–363.

*Primary Examiner*—Paul E. Konopka

[57] ABSTRACT

Included is a process for redispersing catalysts wherein the catalyst metal is selected from the group consisting of ruthenium, osmium, rhodium and palladium comprising contacting the catalyst serially with (1) a reducing agent; (2) a halogen redispersing agent; and (3) a reducing agent, under conditions sufficient to redisperse the sintered catalyst. A preliminary oxygen treatment is optional. Also included are the novel catalysts such as redispersed by the foregoing process and processes in which sintered catalysts are redispersed and in which the redispersed catalysts are employed.

The redispersed catalysts can have very high activity and can even have activity higher than originally found. A preferred metal is palladium and a preferred support is alumina.

A preferred process for employing the redispersed catalyst is the production of α-substituted acrylate esters. For example, methylmethacrylate can be prepared from carbon monoxide, 2-chloropropene and methanol in the presence of the redispersed palladium on alumina catalyst.

9 Claims, No Drawings

REDISPERSAL OF RU, OS, RH AND PD CATALYSTS AND PROCESSES THEREWITH

FIELD

The invention concerns increasing the catalytic efficiency of certain noble metal catalysts and improved processes in which the catalysts are employed. It also concerns the more efficient catalysts.

BACKGROUND

Catalysts such as ruthenium, osmium, rhodium or palladium are generally useful in many catalyzed chemical reactions. Often, the chemical reaction involves the synthesis or breakdown of organic chemicals, which may include polymers.

Sintering of supported metal catalysts is a common way of catalyst deactivation. To limit sintering, modifications of the support are usually made or promoters may be added to retard the rate of sintering. If both of these methods fail, the catalyzed reaction is typically run under milder conditions to slow the sintering rate. Should sintering still occur, the most typical solution is to remove the sintered catalyst from the reactor and reload with fresh catalyst. If the sintered catalyst could be regenerated, the total productive lifetime of the catalyst would be significantly increased.

Sintering (i.e., an agglomerization) during a catalyzed chemical process may occur, for example, with increased reaction temperatures, and it may vary with the type of catalyst metal, support and the reaction catalyzed because process-specific chemical complexes may form with the catalyst. Thus, characteristics of the sintered catalyst may vary.

Certain regeneration techniques for certain catalysts are known. For example:

Kearby et al., U.S. Pat. No. 3,134,732 (1964), disclose certain regeneration of certain noble metal hydrocarbon conversion catalysts after burning off carbonaceous deposits by contacting with halogen gas at a temperature of from 15° C. to 677° C. Platinum-containing catalysts are disclosed to be particularly suitable. A prereduction step is disclosed in reference to certain circumstances which relate to the platinum catalysts as saving halogenating agent.

McVicker et al., U.S. Pat. No. 3,969,267 (1976), disclose certain regeneration of reforming catalysts which comprise one or more Group VIII noble metals supported on an inert material by contacting with fluorine. Iridium-containing catalysts are disclosed to be particularly suitable.

Sennewald et al., U.S. Pat. No. 3,488,295 (1970), disclose regeneration of a certaim metallic palladium-containing catalyst by water washing; exposing to chlorine gas at an elevated temperature up to 500° C.; passing air; introducing to an aqueous hydrazine hydrate solution at about 35° C. to 50° C.; decanting the solution; washing with water; treating with 1–30 percent aqueous alkali metal acetate solution; decanting; and drying. An $O_2/N_2$ burning-off is optional. Specifically disclosed is a certain catalyst of metallic palladium deposited on silicic acid.

What is lacking and what is needed is a process which regenerates noble metal catalysts other than of platinum and iridium and which is highly efficient. Such process which may yield a highly active redispersed catalyst is most desirable.

SUMMARY

In one aspect, the invention is a process for redispersing catalysts wherein the catalyst metal is selected from the group consisting of ruthenium, osmium, rhodium and palladium comprising contacting the catalyst serially with
 (1) a reducing agent;
 (2) a halogen redispersing agent; and
 (3) a reducing agent,
under conditions sufficient to redisperse the catalyst. Another aspect of the invention comprises the novel catalysts such as redispersed by the foregoing process. A further aspect of the invention comprises processes in which sintered catalysts are redispersed and in which the redispersed catalysts are employed.

The process of the invention is useful for regenerating sintered catalysts and increasing the activity of fresh catalysts, and it results in a highly active redispersed catalyst. Because of the select method of redispersing, the redispersed catalyst can have higher activity than obtained by other methods of regeneration. Even more surprisingly, the redispersed catalyst can have higher activity than exists as a freshly prepared catalyst. The process is highly efficient, requiring short periods of time and simple steps, and it may use readily available, inexpensive reagents.

ILLUSTRATIVE EMBODIMENTS

The catalyst metals are of Ru, Os, Rh and Pd. Pd is most preferred.

Suitable catalysts which can be redispersed are supported catalysts which contain a catalytic amount of the catalyst metals. Preferably, the catalyst metals comprise from about 0.1 to about 10 percent of the mass of the whole supported catalyst.

Preferred supports include refractory supports. The refractory supports include supports such as silica, magnesia and alumina. Alumina is most preferred. An especially preferred catalyst is the Pd catalyst of copending U.S. patent application Ser. No. 636,055, filed July 30, 1984 (the whole disclosure of which is incorporated herein by reference).

Redispersion is a form of regeneration wherein the average metallic crystallite size is substantially decreased. The decrease in the crystallite size from the redispersion typically results as from apportioning of a larger crystallite into a plurality of smaller crystallites.

The redispersion typically increases the activity of the catalyst. The increased activity after the dispersion may be about 3 to 4 orders of magnitude (i.e., about 1000 to 10,000 times the activity) of the catalyst activity before the redispersion. For example, virtually zero conversion activity in a process employing a sintered catalyst to 95 percent conversion in the process after redispersion may be obtained. The increased activity is preferably even higher than the original catalyst activity (i.e., fresh catalyst before sintering). The effectiveness of redispersion can depend on the characteristics of the catalyst and on the conditions used in the redispersing.

Preferably, the activity of the redispersed catalyst is about 90 percent or above the original activity, more preferably above about 100 percent, even more preferably about 110 percent or above, and most preferably about 120 percent or above. The activity is measured as percent mole conversion to the desired product of the process in which the catalyst is employed.

An optional first step in the redispersing process is a preliminary oxygen treatment. This "cleans" the catalyst by typically removing carbonaceous and other deposits, as appropriate, for example, with sintered catalysts which have been employed in catalytic processes involving contact with organic reactants or products. The oxygen treatment is preferably with a gas which is a source of oxygen such as with a nitrous oxide-, oxygen- or ozone-containing gas at elevated temperatures, more preferably with an oxygen-containing gas such as air. Preferred elevated temperatures include temperatures from about 200° C. to about 800° C., most preferably from about 400° C. to about 600° C. Preferred pressures include pressures from about 0.01 atmospheres to about 1000 atmospheres (i.e., about 1.01 kPa to about 101,000 kPa), most preferably about ambient pressure. Preferred times are from about 1 hour to about 100 hours, most preferably from about 4 hours to about 48 hours. The time is typically interrelated with the temperature and pressure; for example, as the temperature increases, the time of the oxygen treatment typically decreases. Preferably, the deposits are removed from the catalyst metal, most preferably from essentially all sintered catalyst components including supports, promoters (e.g., promoters such as those containing tungsten), etc.

The first required step in the redispersing process is the first reduction. This step is critical in helping to obtain the high activity of the redispersed catalyst. The free catalyst metals are typically redispersed more effectively than their compounds such as their oxides. The first reduction is with a reducing agent such as hydrogen, methane and hydrazine, more preferably a gaseous reducing agent and most preferably hydrogen. The first reduction can be a partial reduction. Preferred temperatures include temperatures from about 0° C. to about 500° C., most preferably from about 200° C. to about 450° C. Preferred pressures include pressures from about 0.01 atmospheres to about 1000 atmospheres (i.e., about 1.013 kPa to about 1,013 kPa), most preferably about ambient atmospheric pressure. Preferred times are from about 1 hour to about 100 hours, more preferably from about 2 hours to about 48 hours. The time depends on factors such as the temperature and the type of sintered catalyst involved. For example, the following table lists most preferred approximate times for sintered catalysts with alumina supports at a pressure of about 1 atmosphere:

| Catalyst Metal | Temperature | Time |
| --- | --- | --- |
| 5 Percent Ru | 300° C. | 2 hours |
| 10 Percent Os | 300° C. | 2 hours |
| 5 Percent Rh | 400° C. | 2 hours |
| 5 Percent Pd | 450° C. | 1 hour |
| 5 Percent Pd | 350° C. | 2½ hours |

Metallurgical properties of the catalyst metal of each catalyst typically affects the time and temperature employed, especially at higher temperatures. A preferred result at this stage (i.e., after the first reduction) is reduction of the active metallic component to the metal or to an average valent state approaching zero.

The second required step in the redispersion process is the step employing the halogen redispersing agent (i.e., means for redispersing with a material such as a halogen-containing material). Preferred halogens include gaseous bromine and chlorine, most preferably chlorine. The halogen-containing agent preferably contains halogen in a concentration of from about 1 to 100 mole percent, most preferably from about 10 to about 60 mole percent. An inert diluent can be present, preferably as a gas such as nitrogen, helium and argon, most preferably nitrogen. Temperatures are preferably elevated. Preferred elevated temperatures include temperatures from about 200° C. to about 700° C., more preferable from about 350° C. to about 550 ° C. Preferred pressures include pressures from about 0.01 atmospheres to about 1000 atmospheres, most preferably ambient atmospheric pressure. Preferred times are from about 1 hour to about 100 hours, most preferably from about 2 to about 24 hours. Time is similarly related to the temperature and pressure as with the first and second step. The foregoing process conditions are also related to the catalyst metal present. For example, with Pd, a preferred lower limit of the elevated temperature in lieu of the general 200° C. lower limit is about 300° C., as at about 275° C. no redispersing typically occurs (after the first reduction) with the halogen redispersing agent 50 mole percent elemental chlorine and 50 mole percent elemental nitrogen, and a most preferred elevated temperature range for the step employing the halogen redispersing agent is from about 400° C. to about 460° C.

The third required step in the redispersing process is the second reduction. Conditions and agents are preferably those employed in the first reduction step.

The reduction steps may cause some agglomeration, especially on the atomic scale. However, this may be desirable in producing a reduced redispersed catalyst of high activity and even selectivity.

Final crystallite sizes as measured by volumetric hydrogen chemisorbtion are preferably about 5.0 nm (i.e., nanometers) or less, most preferably abou 2.0 nm or less. A layer of the catalyst metal such as a monoatomic layer may be generated.

In the volumetric hydrogen chemisorbtion method, the total hydrogen adsorption is first measured and then the physical adsorption of hydrogen is measured. The amount of hydrogen chemisorbed is the difference between these two measurements. Detailed descriptions of hydrogen chemisorption are published in a number of different sources such as in J. Lemaitre, P. Menon, F. Dellanay, "The Measurement of Catalyst Dispersion" in *Characterization of Heterogeneous Catalysts*, F. Delannay (ed.), Marcel Dekker, pp. 299–324 (1984) and in J. R. Anderson, *Structure of Metallic Catalysts*, Academic Press, pp. 289–363 (1975) (each of which is incorporated herein by reference). Hydrogen is the gas used for chemisorption, and the ratio of the moles of atomic hydrogen to moles of total metal present ($H/-Metal_{total}$) is the measure of the dispersion (D) of the metal. An average crystallite diameter ($d_{av}$) can then be determined from the equation $d_{av}=6(V_m/A_m)/D$ where $V_m$ and $A_m$ are as defined in Anderson, pp. 358–363. After substitution of the appropriate values, a general approximation for the average crystallite diameter of the catalyst metals herein is $d_{av}=1.2/D$ (where $d_{av}$ is in nanometers). Transmission electron microscopy measurements can also be employed to generally support the measurements by volumetric hydrogen chemisorbtion.

The catalysts may be redispersed in reactors in which they are employed. Following he redispersal, the reactor can usually be operated again in the catalytic preparation of the same product (i.e., the redispersed catalyst can be placed again "on-stream").

A preferred process in which such redispersal is carried out as an integral part of the process is the process for the preparation of an α-substituted acrylate ester of the aforementioned U.S. patent application Ser. No. 636,055. Also preferred is the process of U.S. Pat. No. 4,480,121 (1984) to Klun et al. (incorporated herein by reference).

SPECIFIC EMBODIMENTS

The following examples further illustrate the invention. Percentages are by weight unless otherwise stated. Measurement of the average catalyst metal crystallite size is carried out by the volumetric hydrogen chemisorbtion method.

EXAMPLE 1

Redispersion of a Sintered Palladium Catalyst

A 5 percent $Pd/Al_2O_3$ catalyst is used for the carbonylation of 2-chloropropene in the presence of methanol to form methylmethacrylate. During the course of operation, the average palladium crystallite size is increased to 20 nm from an initial crystallite size (fresh catalyst) of 1.5 nm.

Upon purging the reactor with nitrogen, a flow of oxygen is started through the reactor and the temperature is increased to 500° C. Upon completion of the oxidation (2 hours), the catalyst is cooled to 25° C., is purged with nitrogen and then is reduced in flowing hydrogen at 400° C. for 2 hours. The reduced catalyst is cooled to 100° C., is flushed with nitrogen and is then heated in a flowing mixture of 50 percent chlorine and 50 percent nitrogen at 450° C. for 2 hours. The catalyst is then reduced in flowing hydrogen (50 mole percent hydrogen in nitrogen) at 250° C. for 2 hours. Measurement of the average palladium crystallite size (redispersed catalyst) shows it to be 1.5 nm.

EXAMPLE 2

Redispersion of 5 Percent $Pd/Al_2O_3$ by Treatment in Dilute Chlorine at 400° C.

A sample of sintered 5 percent $Pd/Al_2O_3$ from the reaction of 2-chloropropene, carbon monoxide and methanol is oxidized and reduced in the manner of Example 1 and then is treated in a 50 mole percent chlorine and 50 mole percent nitrogen stream at 400° C. for 2 hours. The average palladium crystallite size changes after a second reduction to 2.4 nm from an initial value of 5.1 nm.

EXAMPLE 3

Redispersion of Palladium on a Fresh Catalyst

A sample of a fresh commercial 5 percent $Pd/Al_2O_3$ catalyst is obtained (Calsicat Div. of Mallinkrodt Chemical Co.). The fresh commercial catalyst is reduced with $H_2$ at 400° C. for 2 hours, and the average palladium crystallite size is measured and is found to be 5.1 nm. Then the catalyst is treated in a 50 mole percent chlorine in nitrogen at 450° C. After a second reduction with $H_2$ at 250° C. for 2 hours, the average palladium crystallite size is found to be 1.4 nm.

EXAMPLE 4

Redispersion of 5 Percent Rh/alumina

A sample of a fresh commercial 5 percent Rh on alumina (Johnson-Matthey) is reduced in flowing $H_2$ and the average Rh crystallite size is about 3.7 nm. This reduced catalyst is treated in a 50 mole percent chlorine in nitrogen stream at 550° C. for 2 hours and is finally reduced with $H_2$ at 400° C. for 2 hours. The average Rh crystallite size on the finally reduced catalyst is 1.9 nm.

EXAMPLE 5 WITH COMPARATIVE EXAMPLES A AND B

Catalytic Activity of Redispersed Pd Catalyst in a Process for Preparation of an α-Substituted Acrylate Ester The redispersed catalyst of Example 1 is employed in a process to produce methylmethacrylate from 2-chloropropene, carbon monoxide and methanol. For comparative purposes, the fresh catalyst of Example 1 (Comparative A) and the fresh commercial catalyst of Example 2 as once reduced (Comparative B) are employed in the comparable process.

In the following, each catalyst is contacted with carbon monoxide, 2-chloropropene and methanol in a 1:1:2 mole ratio. The feed rates employed are expressed in terms of hourly space velocity (i.e., HSV) which is unit volumes of feed per unit volume of catalyst per hour. The carbon monoxide feed rate (gas) is 150 gas-HSV. The liquid feed rate is 0.72 liquid-HSV. The following reactions are each conducted at 600 psig (i.e., gauge pressure of about 4,137 kPa). Conversion is based on moles of 2-chloropropene converted to product. Selectivity of the converted 2-chloropropene to methylmethacrylate in each case is between 85 and 90 percent.

| Catalyst | Hours On-Stream | Temperature | Percent Conversion |
|---|---|---|---|
| Example 1 (redispersed) | 2 | 205° C. | 75 |
| Example 1 | 12 | 205° C. | 69 |
| Example 1 | 24 | 205° C. | 60 |
| Comparative A (initially 1.5 nm) | 12 | 205° C. | 55 |
| | 24 | 205° C. | 50 |
| Comparative A | 100 | 210° C. | 50 |
| Comparative A | 200 | 209° C. | 40 |
| Comparative A | 300 | 209° C. | 33 |
| Comparative A | 400 | 208° C. | 29 |
| Comparative A | 500 | 208° C. | 25 |
| Comparative A (sintered, 20 nm) | 600 | 218° C. | 45 |
| Comparative B (initially 5.1 nm) | 2 | 210° C. | 45 |
| Comparative | 24 | 280° C. | 10 |

The preceding data illustrates that the activity of the sintered catalysts can be restored and the activity of freshly prepared catalysts can be significantly improved by the redispersion process of the invention. This data also illustrates that the activity of the redispersed catalyst of the invention can be higher than the activity of the original catalyst itself (e.g., from about 120 percent activity to even as high as 600 percent or more) at comparable times (e.g., 24 hours) on-stream. This data additionally illustrates that the high activity of the redispersed catalyst can endure longer than the activity of the original catalyst before the redispersion.

I claim:

1. A process for redispersing and reducing a supported metal catalyst wherein the catalyst metal is ruthenium, osmium, rhodium or palladium supported by a refractory support and wherein
    (1) the catalyst had been prepared by impregnating a metal salt of the catalyst metal on the refractory support and activated by passing hydrogen gas over the catalyst at a temperature of between about 150° C. and 350° C. for a period of time sufficient to reduce the metal salt on the refractory support;

(2) the supported metal catalyst had been deactivated in a vapor phase process for the preparation of an α-substituted acrylate ester which comprised contacting
  (a) a haloalkene, wherein the halogen is substituted on an olefinic carbon atom which is further substituted with a $C_{1-10}$ alkyl, $C_{3-10}$ cycloalkyl, $C_{6-10}$ aryl, $C_{7-10}$ alkaryl, $C_{7-10}$ aralkyl, cyano, or trihalomethyl group;
  (b) an alcohol or an ether; and
  (c) carbon monoxide,
  in the presence of the catalyst under conditions sufficient to have prepared an α-substituted acrylate ester and a hydrocarbyl halide with a catalyst producivity of 0.06 g of product per gram of catalyst per hour or greater; and
(3) the above-mentioned deactivated catalyst is redispersed and reduced by contacting the catalyst serially with:
  (a) a reducing agent under conditions sufficient to at least partially reduce the catalyst metals,
  (b) gaseous chlorine or bromine under conditions sufficient to redisperse the catalyst metal on the support, and
  (c) reducing the agent under conditions sufficient to finally reduce the catalyst metal essentially to its metallic state,
  thereby producing a redispersed catalyst having an activity for the conversion of 2-chloropropene, methanol and carbon monoxide into methylmethacrylate and chloromethane which is at least 110 percent of the activity of the catalyst initially prepared as described above.

2. The process of claim 1 wherein the catalyst for redispersing is a sintered catalyst and the sintered catalyst is additionally subjected to a preliminary oxygen treatment.

3. The process of claim 2 wherein the catalyst metal is Pd present at an amount from about 1 to about 10 percent by weight; the support is alumina; the haloalkene, carbon monoxide and alcohol or ether are contacted at a temperature of between 125° C. and 250° C., in the presence of a pressure of between 100 and 800 psi, and the mole ratio of alcohol or ether to haloalkene is 2.0 or greater.

4. The process of claim, 3 wherein sintering of the sintered catalyst for redispersion occurred in said vapor phase preparation of an α-substituted acrylate ester.

5. The process of claim 4 wherein the alcohol or ether is methanol; the halocarbon is 2-chloropropene; and the α-substituted acrylate ester is methylmethacrylate.

6. The process of claim 1 wherein the redispersed catalyst has an activity above about 100 percent of its original activity.

7. The process of claim 6 wherein the activity of the redispersed catalyst is about 110 percent or more of its original activity as at 24 hours on-stream.

8. The process of claim 7 wherein the Pd is present from about 3 percent to about 7 percent by weight.

9. The process of claim 8 wherein the activity of the redispersed catalyst is about 120 percent or more of its original activity as at 24 hours on-stream.

* * * * *